Oct. 17, 1933.    N. S. BLACK    1,931,402
STORAGE BUILDING
Filed July 5, 1929    3 Sheets-Sheet 1
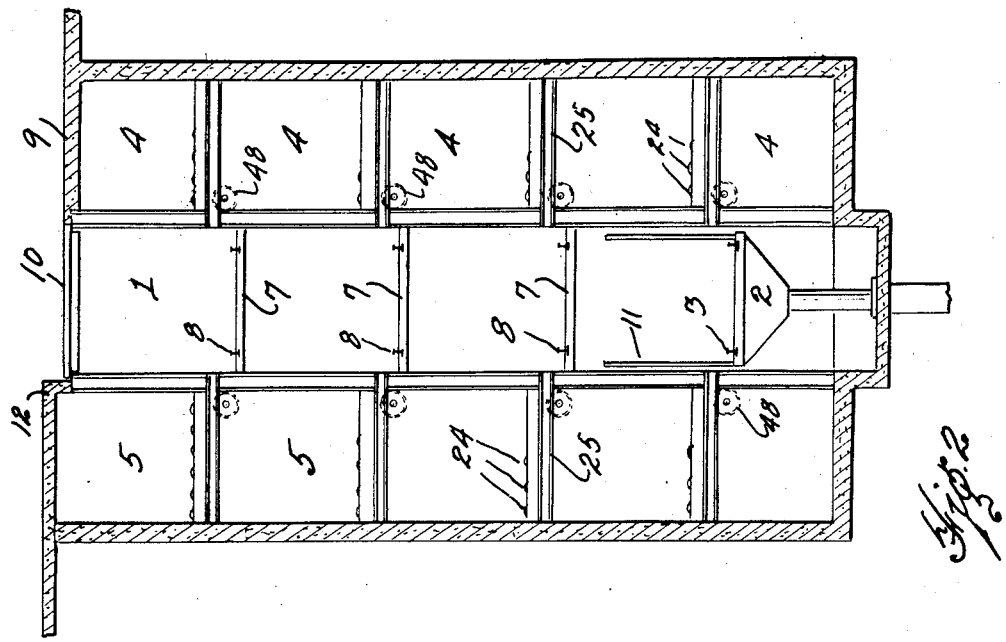
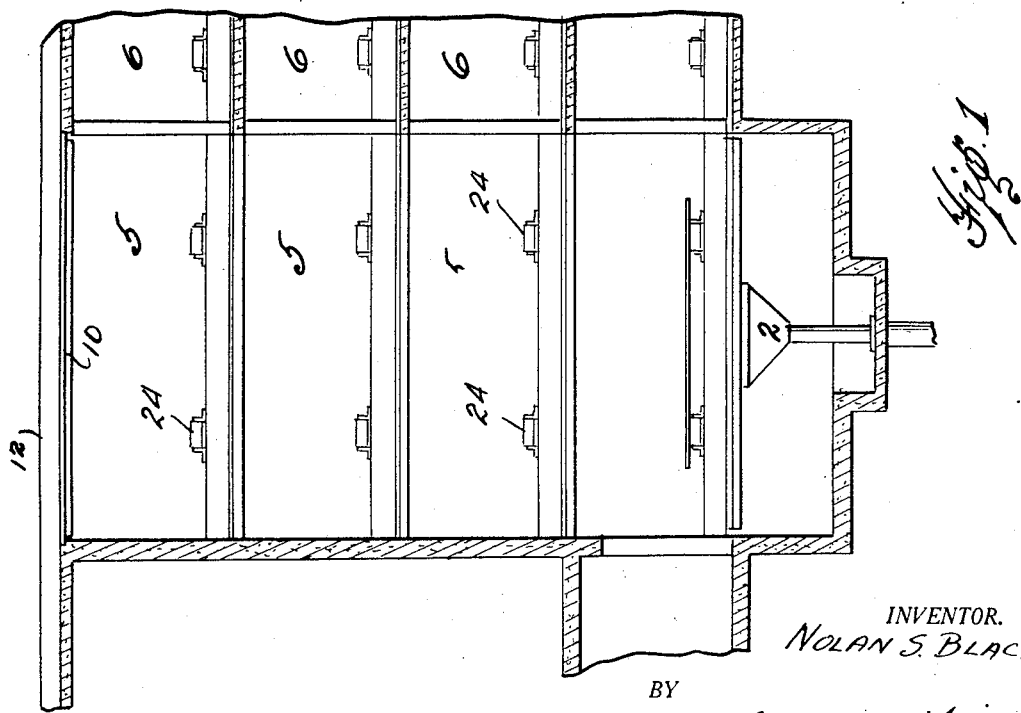
INVENTOR.
NOLAN S. BLACK
BY
ATTORNEY.

Oct. 17, 1933.                N. S. BLACK                1,931,402
                           STORAGE BUILDING
                         Filed July 5, 1929         3 Sheets-Sheet 2

INVENTOR.
NOLAN S. BLACK
BY
ATTORNEY.

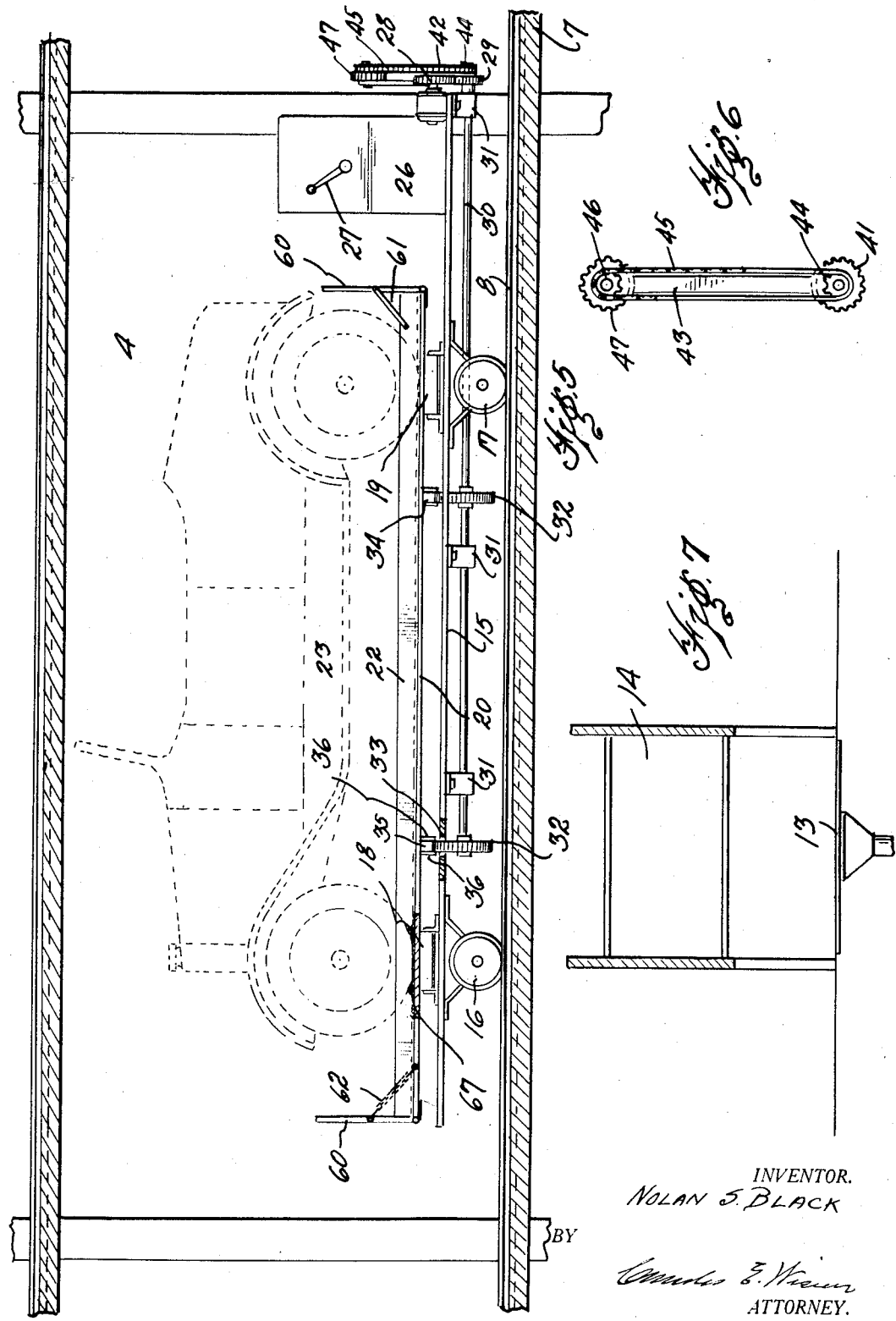

Patented Oct. 17, 1933

1,931,402

UNITED STATES PATENT OFFICE 1,931,402

STORAGE BUILDING

Nolan S. Black, Detroit, Mich., assignor of one-half to Wilfred V. Casgrain, Grosse Pointe Farms, Mich.

Application July 5, 1929. Serial No. 376,250

5 Claims. (Cl. 214—16.1)

This invention relates to storage buildings, its object being to provide a comparatively simple and inexpensive structure for the storage of automobiles or merchandise of various characters. The building may extend either above or below the ground as may be convenient and a feature and object of the invention is to provide a structure having a central elevator including a platform or floor provided with rails to receive a truck, the structure having longitudinal passageways on opposite sides of the elevator shaft containing rails onto which the truck may be moved. In conjunction with this elevator and the central longitudinal passageways are provided two side storage structures forming a component part of the building and having a series of compartments which are of a width to receive an automobile for instance and, by the use of the longitudinal passageways for movement of the truck, an automobile may be placed in any compartment as may be desired.

A feature and object of the invention is also involved in the construction and arrangement of a truck with a movable platform on which the automobile or merchandise to be stored is carried and by which the automobile or merchandise is moved into the compartment on the platform which remains with the article stored until its removal, the truck being provided with mechanism for transferring the platform to the storage compartment and vice versa.

A further object of the invention is to provide a structure erected below the street surface and into which an automobile may be taken from the street level and stored or "parked" for an indefinite period away from street traffic and still be practically instantly available for use.

These and other objects and features of the invention are hereinafter more fully described and claimed, and the preferred form of construction of a storage building embodying my invention is shown in the accompanying drawings in which—

Fig. 1 is a diagrammatic illustration of a longitudinal section of the building showing the elevator.

Fig. 2 is a transverse section thereof.

Fig. 5 is a longitudinal section of the longitudinal passageway showing the truck and the mechanism for operation of the platform.

Fig. 6 is a detail of a portion of the mechanism used in transferring the platform into a compartment.

Fig. 7 is a diagrammatic illustration of a construction that may be utilized when the building is erected above ground.

Figure 3:
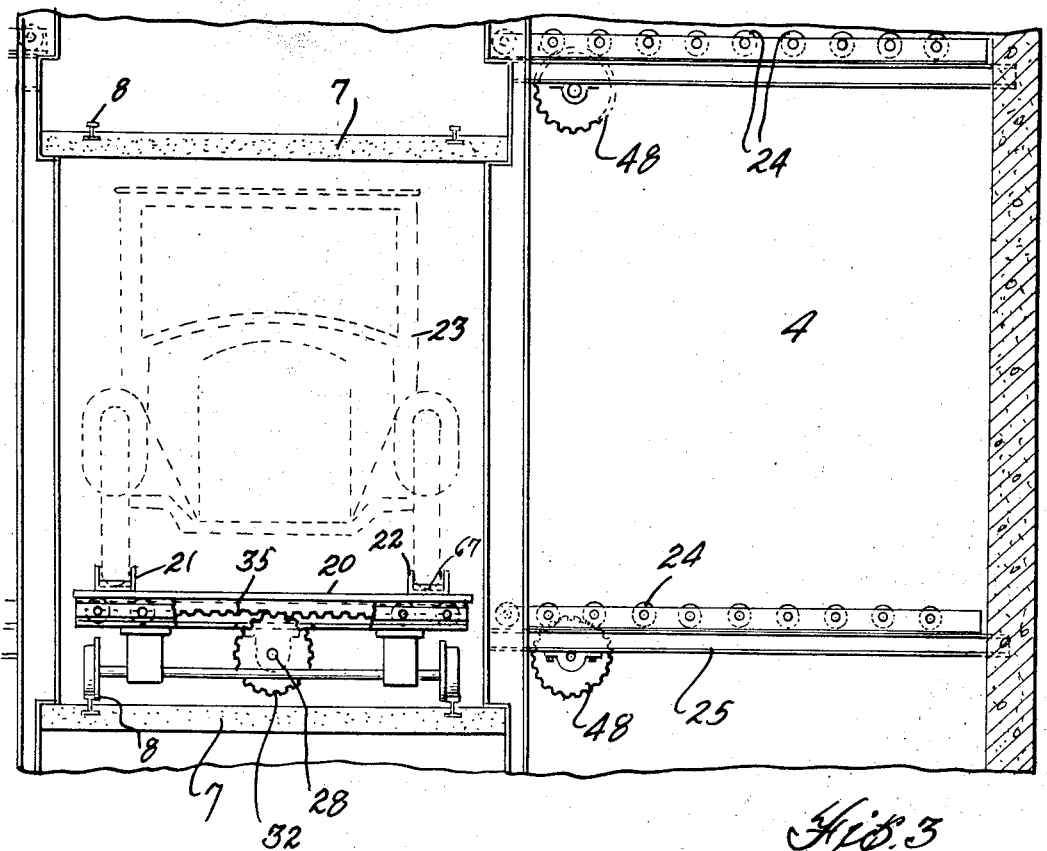
Fig. 3 is an enlarged sectional view taken through the elevator, truck and storage compartment.

The building when erected below ground is shown in Figs. 1 and 2 there being several stories and, as will probably be best understood from Fig. 2, there is a central shaft 1 for the elevator illustrated diagrammatically at 2. This elevator contains a platform having the rails 3 thereon and on one side of the elevator shaft are a series of storage compartments 4, 4 and on the opposite side are the compartments 5, 5 etc.

It is to be understood that these side portions containing the compartments 4 and 5 extend for a considerable distance each way, Fig. 1 showing the compartments 6 of the same character and in the same line so that it will be realized that the storage compartments extend along the building in end to end relationship the several stories being duplicate in construction. The longitudinal passageways at two opposite sides of the elevator shaft have a floor 7 provided with rails 8 which will permit a truck, illustrated in Fig. 5, to be moved from the platform onto these rails in the passageways. As there is a passageway for each story of the building the elevator containing the truck and the merchandise to be stored may be moved to alignment with the floor 7 of any passageway either one side or the other of the elevator shaft and the truck moved thereonto down the passageway to any of the compartments 4 or 5 on either side of the longitudinal passageways. The underground construction has a feature providing an object of the invention that is specifically adapted for the storage of automobiles. This will be understood from the following—

As shown in Fig. 2 the upper end of the building 9 is at the street level below which the building is constructed. The elevator shaft 1 has a movable platform 10 which closes the opening to the shaft permitting a vehicle to move over the shaft when closed.

The elevator may be provided with standards of the desired number illustrated diagrammatically at 11 in Fig. 2 which, when the elevator rises in the shaft picks up the platform 10 raising the same to a sufficient height above the floor of the elevator so that when the elevator floor comes to the street level a vehicle may be driven onto the elevator beneath this movable member 10 which will deposit in place as the elevator is moved downwardly thereby closing the shaft entrance. This platform 10 and the elevator shaft may be provided adjacent the street curb 12 and thus this building may be conveniently built beneath the street at the curb line as suggested in Fig. 2 and a person may drive onto the elevator and the occupants may leave the vehicle at the curb and the vehicle be taken by an attendant to any storage compartment. The vehicle may be locked preventing any one entering the vehicle or utilizing it in any way while it is in storage and thus be returned to the owner upon demand in exactly the same condition as it was when placed in storage. This would solve the parking problem for many of our large retail business houses, the attendant for instance taking the owner's vehicles off the street during the time he or she is shopping or attending to matters in the general locality of the building. It is also to be observed that if the structure were to be built above ground for the storage of automobiles or merchandise, the vehicle may be driven onto the platform 13 of Fig. 7 at the street level and moved upwardly in an elevator shaft indicated generally at 14, the building of Fig. 7 being in all general respects as to the passageways and compartments as is the case with the underground structure above described.

Figure 4:
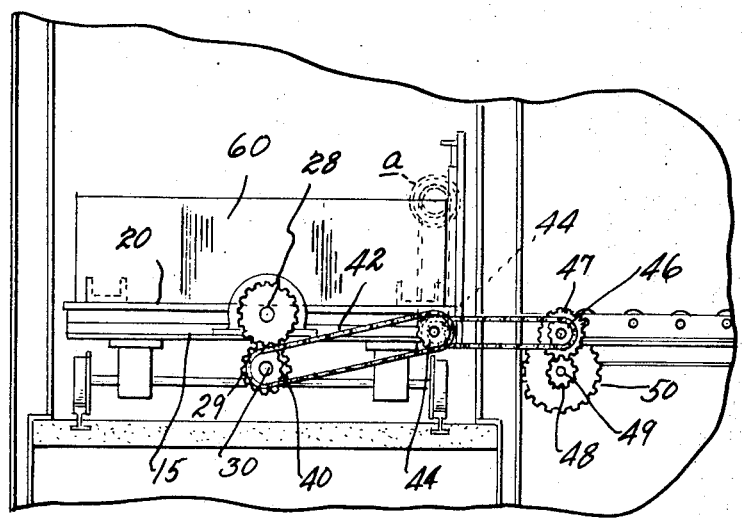
Fig. 4 is an end view of the truck showing the mechanism employed in transferring the platform and material from the truck to the storage compartment.

An essential feature of the invention is in the provision of a truck illustrated in Figs. 3, 4 and 5 which has a fixed platform 15 supported by the truck wheels 16 and 17 adjacent opposite ends thereof and on this platform or base 15 is provided a series of rollers 18 toward one end and 19 toward the opposite end on which is supported a movable platform 20. This movable platform may have a flat surface onto which all characters of merchandise packaged or otherwise may be deposited for storage or it may be provided with trackways 21 and 22 forming grooves or guides enabling a person to drive an automobile illustrated by dotted lines 23 in Figs. 3 and 5. These guides or runways 21 and 22 extend longitudinally of the movable platform 20 while the rollers 18 and 19 are positioned in rows running transversely of the platform 15 of the truck, the axes of the rollers lying longitudinally of the truck body. While I have described rollers for this purpose any other suitable means may be used. Each side compartment 4 and 5 is provided with a corresponding series of rollers 24 secured on the floor 25 of the compartment, and it is to be noted that the floors 7 of the runways are positioned below the floors 25 of the compartments in order that the rollers 18 and 19 on the truck will lie in horizontal alignment with the rollers 24 of a compartment so that in moving a platform 20 from the truck it will pass onto the rollers of a compartment.

The mechanism for transferring the platform 20 from the truck to a compartment on either one side or the other of the elevator shaft consists of a power device illustrated diagrammatically at 26 in Fig. 5. This power device may be of any convenient type but is here intended to indicate an electrical apparatus having a control handle 27.

Whatever the form of power apparatus may be it is to be understood as being controllable by the operator and when in operation rotates a shaft having the gear 28 thereon. This motor apparatus 26 is mounted on the upper face of the fixed platform 15 and the gear 28 is in mesh with a gear 29 on the end of the shaft 30 running underneath the fixed platform and supported by a series of bearings 31. On the shaft and preferably between the truck wheel 16 and 17 are a pair of ears 32 and 33 preferably respectively adjacent the truck wheels 17 and 16. These gears extend through apertures 33a provided therefor in the platform 15 and engage the respective racks 34 and 35 secured to the under side of the movable platform 20. These racks may have guide plates 36 thereon between which the gears 32 and 33 are positioned which tend to hold the movable platform 20 from longitudinal displacement but other means may be provided if desired for preventing longitudinal displacement of the movable platform.

As is shown more clearly in Fig. 4 the shaft 20 at its outermost end adjacent the gear 29 has a sprocket 40 and adjacent the edge of the truck platform 15 is provided a similar sprocket 41 through means of the sprocket chain 42. Also, on the shaft of the sprocket 41 is carried a bar or plate 43 pivoted on the shaft of the sprocket 41 and, as will be understood from Fig. 6, associated with the sprocket 41 on the same shaft is a sprocket 44 connected by means of a chain 45 with a sprocket 46 at the opposite end of the bar 43. On the shaft of this sprocket 46 is a gear 47, this latter construction being more clearly shown in the detail Fig. 6.

It will thus be seen that, by operation of the motor and gear 28, the shaft 30 is driven by means of the gear 29 and also the sprockets 40, 41, 44, 46 and gear 47, due to the pivotal relation of the bar 43 on the shaft of the sprockets 41 and 44, the bar and the sprocket 46 and gear 47 may be raised to the dotted position a indicated in Fig. 4 and when in the full line position shown in the said Fig. 4 the gear 47 is brought to mesh with a gear 48 which is provided in each compartment 4 or 5 of the entire series. This gear 48 is on a shaft 49 and positioned on the shaft 49 in each compartment are a pair of spur gears 50 (only one of which is here shown) corresponding in position to the gears 32 and 33 on the shaft 30 of the truck. The purpose of this arrangement is that, when the truck is positioned opposite a compartment 4 or 5 into which the movable platform is to be moved, the bracket 43 and gear 47 are brought to the full line position shown in order that it may drive the gears 50. Thus, in operation of the motor 26 the shaft 30 being rotated and due to the meshing of the gears 32 and 33 with the racks 34 and 35 on the movable platform, the said movable platform is moved transversely from the truck onto the rollers 24 of the respective compartment. The racks on the under side of the movable platform in passing from the truck and engagement with the gears 32 and 33 thereon come to mesh with the gears 50 which, being driven by the gear 47, complete the moving of the movable platform into a compartment after the racks have passed out of mesh with the gears 32 and 33 of the truck.

Likewise, in removing the movable platform with the goods thereon from the compartment to the truck, the gears 43 and 38 are rotated in a reverse direction by means of the motive power or any intervening mechanical arrangement to produce the reverse rotation of the gears 32 and 33. Under this condition the gears 32 and 33 take charge of the movable platform as the racks thereon pass out of mesh with the gears 50 of the compartment. Thus, by this mechanism the platform may be moved to or from the compartment mechanically and all necessity of manual movement of the platform 20 and goods thereon is avoided. Due to the rollers provided both on the truck and the floor of the compartment heavy weights such as automobiles and other apparatus may be moved easily.

Due to the fact of its being desirable to provide a series of compartments 4 in end to end relationship on one side of the elevator shaft and passageways connecting therewith and compartments 5 likewise arranged on the opposite side of the elevator shaft, the mechanism for transferring the platform 20 in a direction opposite to that above described relative to Fig. 4 would be provided on the opposite side of the end of the truck as indicated by dotted lines b in duplicate of the sprocket 40, chain 42, sprockets 41, 44, 46 and gear 47.

As previously stated, the movable platform 20 may be arranged for the placing thereon of goods and packages of various types, and when it is to be used for an automobile I preferably employ the channel or guideways 21 and 22 into which the wheels of the automobile pass in driving the same onto the platform and the vehicle is thus held from lateral displacement relative to the platform 20.

A pair of depressions 67 are provided in the platform 20 as shown in Fig. 5 for the wheels at one end of the automobile to prevent the automobile from longitudinal movement on the movable platform 20.

When used for the disposition of automobiles the platform preferably is provided at each end with a hinged plate 60 which is held in vertical position by a releasable hook 61 or chain 62 both forms of which are shown in Fig. 5 at the opposite ends of the platform 20. In moving a vehicle onto this platform 20 the platform is turned downwardly to contact with the edge of the floor 7 of the longitudinal passageway terminating at the elevator shaft and thus provides a platform covering the interstice between the floor and the platform 20 carried by the movable truck and when the vehicle has been positioned on the platform these end plates 60 are raised to upright position as shown in Fig. 5, which will prevent the vehicle accidentally moving off from the platform while on the elevator.

From the foregoing description it will be evident that the structure described embodies the various features and objects hereinafter set forth; that any character of goods or material within the capacity of the elevator, platform and compartments may be taken from the street level and stored in this structure whether either above or below ground, the structure of the building proper being practically identical in either case although the arrangement of the elevator is somewhat different in that when the structure is built above ground the vehicles are driven onto the elevator and lifted to the various runways extending outwardly from one or both sides of the elevator shaft to be distributed laterally to the side compartments.

If the structure be built under ground the vehicle moves from the ground surface onto the elevator and movable platform as in the previous case but the elevator moves downwardly to the floor desired and the merchandise or vehicles are distributed in the same manner. It will also be evident that the structure may be arranged for use with more than a single elevator, and that an essential characteristic of the invention is the arrangement of the longitudinal passageways or runways adapted for the passage of a movable truck from an elevator thereinto and along the passageway to any desired side compartment, and that by this arrangement the goods or vehicles stored in any compartment are practically instantly available to be returned to the street surface irrespective as to whether the structure be built above or below ground and in conjunction with which is provided the movable platform on which the goods, merchandise, or vehicle is originally placed in moving into the building and remaining therewith until its removal from the building.

Having thus fully described my invention, its utility and mode of operation, what I claim and desire to secure by Letters Patent of the United States is—

1. A building for the storage of goods, merchandise, vehicles and the like, comprising a plurality of floors each having a longitudinal passageway and compartments on each of the opposite sides thereof open to the passageway, an elevator shaft substantially centrally of the structure, the longitudinal passageways opening thereto on opposite sides, an elevator in said shaft, a truck carried by the elevator and movable therefrom onto and along the passageways of a floor with which the elevator may be brought to practical registration, a movable platform carried by the truck, anti-friction means on the truck for sustaining the movable platform, a pair of racks on the under side of the platform, a shaft supported by the truck, gears on the said shaft for engaging the respective racks, each of the compartments also having anti-friction means onto which the platform may be moved, a shaft for each compartment having gears thereon adapted to engage the racks as the platform is moved from the truck to the compartment, and power mechanism carried by the truck and adapted to be detachably connected with the shaft of any compartment whereby both the shaft on the truck and the shaft of the compartment are simultaneously operated and the platform first moved from the truck to engage the gears of the compartment and as the platform leaves the truck continuing movement of the platform into the compartment.

2. A building for the storage of goods and merchandise comprising a plurality of floors each having a longitudinal passageway and compartments on each of the opposite sides thereof open to the passageway, an elevator shaft at which the passageways terminate at one end, an elevator in said shaft, a truck carried by the elevator, rails on the elevator and rails in each passageway onto which the truck may be moved from the elevator, a platform on the truck, anti-friction means supporting the platform arranged to permit lateral movement thereof, power mechanism on the truck for causing lateral movement of the platform, anti-friction means in each compartment to any one of which the platform may be moved when the truck is positioned adjacent thereto, mechanism in each compartment also adapted to cause lateral movement of the platform, and means for connecting said mechanism with the power mechanism of the truck whereby as the platform is moved from the truck by the power mechanism it is brought to operative relationship with the mechanism of the compartment and movement thereafter continued onto the compartment as the platform leaves the truck.

3. In a building, a floor having a passageway and a series of storage spaces in succession along one side thereof opening to the passageway, a truck movable along the passageway, a platform carried by the truck and movable laterally thereof, means carried by the truck for moving the platform laterally therefrom into a storage space aligned therewith, means in each storage space operable to move the platform thereon to the truck, and means carried by the truck and associated with said platform moving means thereon adapted for detachable connection with the said means in the aligned storage space for operating the same to move the platform from the storage space to the truck.

4. In a building, a floor having a passageway and a series of storage spaces in succession along one side thereof and opening thereto, a truck movable along the passageway, a platform carried by the truck and movable laterally thereof, means carried by the truck for moving the platform therefrom into a storage space aligned therewith, anti-friction means in each storage space onto which the platform may be transferred, a platform moving means in each storage space and connected with the platform on its movement into the space, and means on the truck associated with said platform moving means thereon for engaging said platform moving means of the storage space and operating the same to move the platform from the storage space to the truck.

5. In a buliding, a floor having a passageway and a series of storage spaces along one side thereof opening thereto, a truck movable along the passageway, a load supporting device carried by the truck, anti-friction means on the truck supporting the said load supporting means, mechanism on the truck including a gear and a rack on the load supporting device engaged by the gear whereby through operation of the gear the load supporting device may be moved into a storage space, a gear in each of the said storage spaces and engaged by the said rack upon movement into the respective storage space, and means on the truck operable by said gear thereon adapted for detachable driving connection with the said gear of the storage space for operating the same to move the load supporting device from the storage space to the truck.

NOLAN S. BLACK.